United States Patent [19]

Bardwell

[11] 4,340,554
[45] Jul. 20, 1982

[54] METHOD AND APPARATUS FOR EXTRUSION COATING OF A CABLE INVOLVING GUIDER TIP PROTECTION FROM AN OVERSIZED PORTION OF THE CABLE

[76] Inventor: Robert G. Bardwell, Rte. 1, Box 60, Starksville, Miss. 39759

[21] Appl. No.: 192,031

[22] Filed: Sep. 29, 1980

[51] Int. Cl.³ .......................... B29F 3/10; G01B 3/34
[52] U.S. Cl. ................................. 264/40.7; 264/174; 425/131.1; 425/136
[58] Field of Search .................. 264/40.7, 40.4, 45.9, 264/174; 425/131.1, 136

[56] References Cited

U.S. PATENT DOCUMENTS

| | | | |
|---|---|---|---|
| Re. 29,886 | 1/1979 | Dembiak et al. | 264/40.7 X |
| 2,372,162 | 3/1945 | Ryan . | |
| 2,820,987 | 1/1958 | Bunch | 264/45.9 X |
| 3,914,357 | 10/1975 | Cereijo et al. | 264/40.4 X |
| 4,174,236 | 11/1979 | Dougherty et al. | 264/40.7 X |
| 4,257,991 | 3/1981 | Kirjavainen | 264/45.9 X |

*Primary Examiner*—Philip Anderson
*Attorney, Agent, or Firm*—Cushman, Darby & Cushman

[57] ABSTRACT

A method and apparatus are provided for forming insulated cable from uninsulated cable. Uninsulated cable is fed from a source to a guiding mandrel, and molten cable insulation is extruded between a guider tip and forming die to coat with insulation the cable passing through the mandrel. The coated cable is continuously withdrawn from the forming die. In order to prevent damage to the guider tip, the cross-sectional dimensions of the uninsulated cable are sensed during feeding to the guiding mandrel, and an electrical signal is generated in response to the cable sensing if any cross-sectional dimension of the cable is greater than a predetermined amount. The operation is shut down and/or an alarm is activated in response to the generated electrical signal. Sensing is accomplished utilizing a sensing member mounted for slidable movement against a spring bias, and having a conically shaped aperture formed therein and tapering in the direction of movement of the cable through the aperture.

12 Claims, 2 Drawing Figures

"METHOD AND APPARATUS FOR EXTRUSION COATING OF A CABLE INVOLVING GUIDER TIP PROTECTION FROM AN OVERSIZED PORTION OF THE CABLE

BACKGROUND AND SUMMARY OF THE INVENTION

Conventional apparatus utilized in the cable and wire insulating industry includes an insulation extruder which melts a plastic compound that is to form the insulation, for ultimate deposition of the insulation around the cable or wire to provide the final insulated cable or wire product. Actual coating is accomplished by a tubular mandrel through which the cable is fed, and having a guider tip which cooperates with a forming die. Molten insulation flows over the guider tip between the guider tip and the forming die to evenly coat with insulation the cable passing through the tubular mandrel. A capstan, or like structure, pulls the cable off a payoff spool, and pulls it through the tubular mandrel, the insulated cable ultimately being wound up on a take-up spool.

As long as the cross-sectional dimensions of the cable are uniform (e.g., the cable has a constant diameter) the apparatus described above works well. However, if the bare cable is damaged or poorly constructed, there may be portions thereof that have significantly larger cross-sectional dimensions than the average cross-sectional dimension. If such an oversized portion is pulled through the cable insulating apparatus, it can break the guider tip.

According to the present invention, it has been recognized that guider tip breakage may occur as a result of cable portions having too large a cross-sectional dimension being pulled through the guider tip, and according to the present invention, a method and apparatus are provided which can avoid guider tip breakage (and like adverse consequences) that may result from a cable having too large cross-sectional dimensions. This is accomplished according to the present invention by sensing the cross-sectional dimensions of the bare cable as it is fed to the tubular guide mandrel, and generating a signal in response to the cable sensing if any cross-sectional dimension of the cable is greater than a predetermined amount. The generated signal may provide for automatic shut down of the extruder and the capstan, and/or may activate an alarm or bring components into play which will automatically even out the too-large cross-sectional dimension of the cable.

The apparatus for sensing the cross-sectional dimensions of a cable in accordance with the present invention includes a housing and a sensing member. The housing has first and second opposite open ends and defines an open volume between the first and second open ends. The sensing member has a conically shaped aperture formed therein, and the housing walls or like means are provided for mounting the sensing member for guided slidable movement within the housing open volume in the dimension from the first end to the second end thereof, and so that the conically shaped aperture tapers from the first end of the housing to the second end thereof and is in-line with the openings in the housing first and second ends. A stop member is associated with the housing first end for stopping movement of the sensing member, and spring biasing means act between an annular shoulder in a central interior portion of the housing and the sensing member to bias the sensing member into engagement with the stop member.

The apparatus according to the invention also includes means for mounting a signal generating means in the operative path of slidable movement of the sensing member. For instance, the housing may have a slit formed therein extending in the dimension of slidable movement of the sensing member, and the sensing member may have an actuator extending outwardly therefrom through the slit. With the signal generating means mounted adjacent the slit, the actuating member will move into operative engage with the signal generating means when the sensing member is moved against the bias of the spring means.

It is the primary object of the present invention to provide a method and apparatus for forming insulated cable from bare cable without destruction of the guider tip by sensing the cross-sectional dimensions of the bare cable being fed to the guider tip. This and other objects of the invention will become clear from an inspection of the detailed description of the invention, and from the appended claims.

DETAILED DESCRIPTION OF THE DRAWINGS

Figure 1:
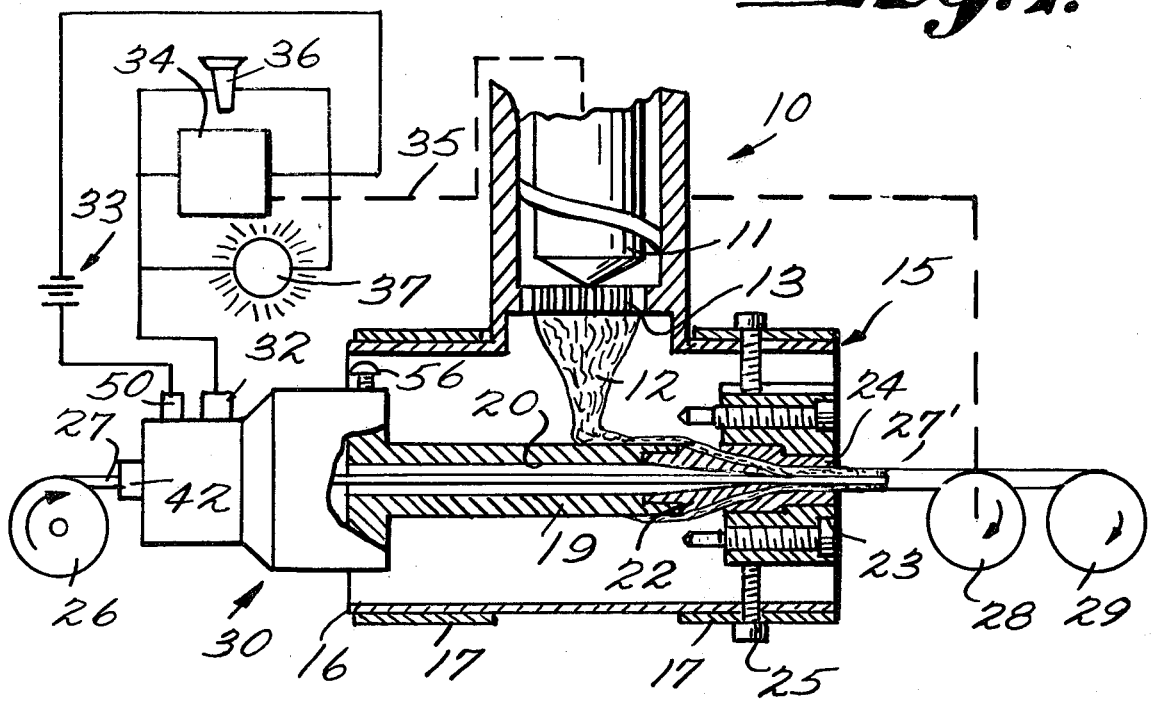
FIG. 1 is a side schematic view, partly in cross-section and partly in elevation, illustrating exemplary apparatus for practicing the method of the present invention.

FIG. 1 illustrates in part conventional apparatus for forming insulated cable from uninsulated cable. Such conventional apparatus includes an insulation extruder 10, which normally will include screw 11 which advances molten plastic (or like insulation material) 12 through breaker plate 13 into extruder head 15. The extruder head 15 includes a housing 16 which may be wrapped by band heaters 17. Mounted centrally of the extruder head 15 is a tubular guide mandrel 19 having an interior passageway 20, and having a guide tip 22 formed at one end thereof. A die holder 23 mounts a forming die 24 in operative association with the guider tip 22. Centering adjustments, such as screws 25, are provided for properly positioning the die holder 23 (and thus the forming die 24) with respect to the guider tip 22 to provide insulation of the desired thickness. Bare cable 27 is fed from payoff spool 26 through passageway 20 in mandrel 19, through guider tip 22, and molten plastic insulation 12 is applied thereto as it emerges out of the guider tip 22. The insulated cable 27' so formed is withdrawn from the forming die 24 by capstan 28, or like structure, ultimately to be taken up on spool 29.

The term ""cable"" as used in the present specification and claims includes both cables and wires or the like, which may be formed of any suitable material. Normally, the invention will be practice utilizing copper wire or the like.

Figure 2:
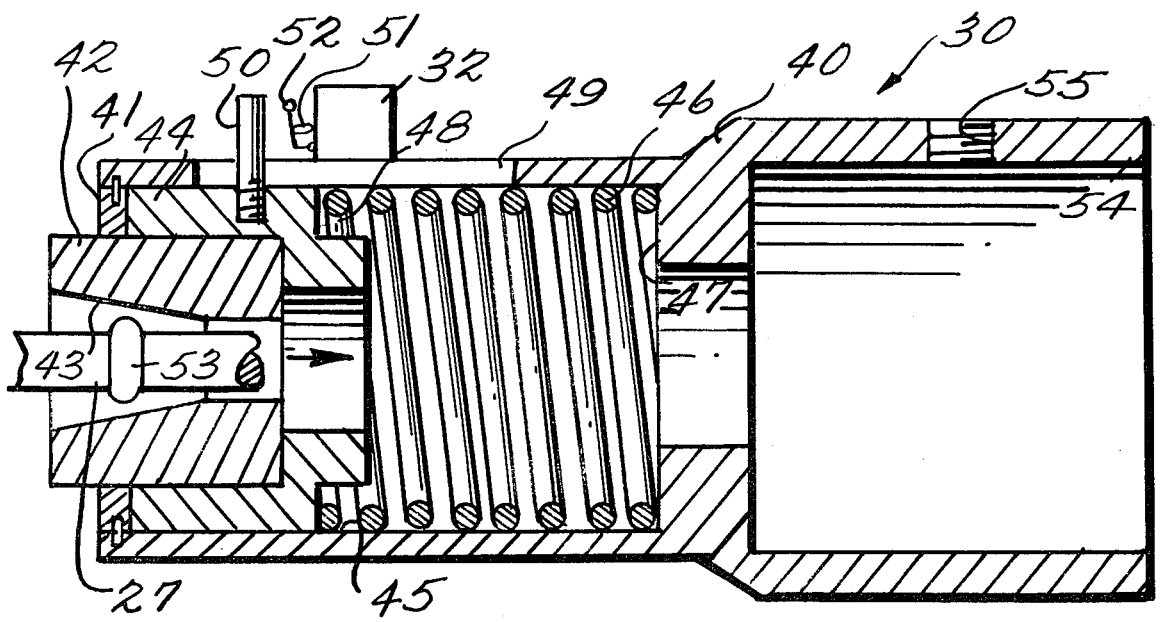
FIG. 2 is a side cross-sectional view of an exemplary apparatus according to the present invention for sensing the cross-sectional dimensions of a cable.

According to the present invention apparatus, indicated generally at 30 in FIGS. 1 and 2, is provided which facilitates prevention of the breaking of guider tip 22 should a bare cable 27 portion have a cross-sectional dimension larger than the cable-exit opening in the guider tip. The apparatus includes means 30 for sensing the cross-sectional dimensions of the uninsulated cable 27 during feeding thereof through the guiding mandrel 19. Apparatus according to the present invention further includes means 32 for generating a signal in response to the cable sensing by sensing means 30, if any cross-sectional dimension of the cable is greater than a predetermined amount.

As indicated in FIG. 1, the signal generating means 32 preferably generates an electrical signal, and may comprise a microswitch. The microswitch 32 is connected up with a circuit with a power source 33 and means for shutting down the cable insulating operation or providing an alarm in response to activation of the microswitch 32. For instance, as illustrated in FIG. 1, microswitch 32 may be operatively connected to a control component 34. As indicated by dotted line 35 in FIG. 1, the control component 34 controls operation of the extruder screw 11 and/or the capstan 28 so that the extruding and cable withdrawing operations may be terminated upon activation of control component 34. The microswitch 32, in addition to or in place of activating the control component 34, may activate an alarm, such as the audible alarm (horn) 36, of the visual alarm (light bulb or light emitting diode) 37.

The sensing means 30 is shown in detail in FIG. 2. The sensing means 30 includes a housing 40 having opposite open ends, with a stop member 41 defining an opening in one of the ends thereof, and a sensing member 42, 44 having a conically shaped aperture 43 formed therein. The sensing member 42, 44 is mounted by housing interior wall portions 45 for slidable movement within housing 40 in the direction of movement (see arrow) of the cable 27, the aperture 43 being tapered in the cable direction of movement. A spring biasing means is disposed between an annular shoulder 47 formed at an interior central portion of the housing 40, and a shoulder 48 formed on sensing member portion 44, to bias the sensing member 42, 44 against stop member 41. The sensing member 42, 44 is slidable against the bias of spring 46 in the direction of the arrow in FIG. 2.

A slit 49 is formed in a housing wall adajcent the stop member 41, the slit 49 extending in the dimension of slidable movement of the sensing member 42, 44. An actuator structure, such as pin 50, extends outwardly from the sensing member portion 44 in a direction generally perpendicular to the direction of slidable movement of sensing member 42, 44. Microswitch 32 is mounted (by screws or any other suitable structure) straddling the slot 49, with the actuator button 51 and actuator lever 52 thereof disposed in the path of movement of the pin 50. Thus when sensing member 42, 44 moves in the direction of the arrow in FIG. 2 as a result of a portion 53 of cable 27 (such as a damaged portion of cable 27) having too large a cross-sectional dimension engaging a small diameter portion of conically shaped aperture 43, pin 50 will engage actuator lever 52 which will depress button 51, activating microswitch 32.

The apparatus 30 further includes the housing second end 54 thereof opposite the housing first end (which includes stop 41). The second end 54 thereof has an interior bore large enough to fit over one end of the tubular mandrel 49, and has a cross-threaded bore 55 formed therein. A screw 56 (see FIG. 1) or the like may extend through the threaded cross-bore 55 and hold the housing 40 in place once the end 54 has been passed over a cooperating end of the mandrel 19, as illustrated in FIG. 1.

The apparatus heretofore described is utilized to practice the method of forming insulated cable from uninsulated cable according to the present invention. The method comprises the following steps:

(a) Uninsulated cable 27 is fed from a source (e.g., payoff spool 26) to the guiding mandrel 19, passing through the interior passageway 20 of the mandrel 19.

(b) Molten plastic cable insulation 12 is extruded by extruder 10 between guider tip 22 and forming die 24 to coat the cable 27 with insulation as it emerges from the passageway in guider tip 22, to form the insulation-coated cable 27'.

(c) The coated cable 27' is continuously withdrawn from the forming die 24, as by utilizing capstan 28, and is utimately taken up on take-up spool 29.

(d) The cross-sectional dimensions of the uninsulated cable 27 are sensed during feeding thereof to the guiding mandrel 19. This is accomplished by mounting end 54 of sensing means housing 40 around an end of mandrel 19 so that the open volume in housing 40, including openings formed in the opposite ends thereof, is in-line with the passageway 20 of mandrel 19. The cable 27 then passes through conically shaped aperture 43 in sensing member 42, 44, which is slidably movable within housing 40. And (e) a signal is generated in response to the cable sensing by sensing member 42, 44 if any cross-sectional dimension of the cable 27 is greater than a predetermined amount. That is, should a portion 53 (see FIG. 2) of bare cable 27 have a cross-sectional dimensional larger than the smallest diameter of the conical aperture 43, that portion 53 will engage the walls of the sensing member 42 defining the aperture 43. Since the cable 27 will continue to be drawn in the direction of the arrow in FIG. 2 under the motive force provided by capstan 28, the sensing member 42, 44 will be moved against the bias of spring 46 in the direction of the arrow in FIG. 2. This movement will cause actuator pin 50 mounted on sensing member portion 44, to be moved to engage microswitch actuators 51, 52 and close the electrical contacts in microswitch 32. The completion of the circuit from power source 53 by microswitch 32 (see FIG. 1) activates control component 34, which—through line 35—terminates operation of extruder screw 11 and/or capstan 28, teminating steps (b) and (c) above. In addition to effecting operation of control component 34, or in place of activating control component 34, microswitch 32 can activate audible alarm 36 and/or visual alarm 37 to provide an indication to the operator that a cable portion having the potential to break guider tip 22 is present.

Once the cable insulation process is shut down and/or an alarm activated, the operator may act upon enlarged cross-sectional dimension portion 53 of cable 27 so that it will pass through aperture 43, or—if that is not possible—will cut out portion 53 and splice the cable 27 back together. Then all of the components can be reset, and the cable insulating apparatus restarted.

It will thus be seen that according to the present invention a method and apparatus for forming insulated cable from uninsulated cable have been provided that facilitate prevention of breakage of the guider tip by sensing the cross-sectional dimensions of the bare cable while being fed to the mandrel.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. A method of forming insulated cable from uninsulated cable utilizing a molten insulation extruder, a cable guiding mandrel, a forming die, and a guider tip of the mandrel, comprising the steps of:
   (a) feeding uninsulated cable from a source to the guiding mandrel;
   (b) extruding molten cable insulation between the guider tip and forming die to coat the cable with insulation;
   (c) continuously withdrawing the coated cable from the forming die;
   (d) sensing the cross-sectional dimensions of the uninsulated cable during feeding thereof to the guiding mandrel; and
   (e) generating a signal in response to the uninsulated cable sensing if any cross-sectional dimension of the uninsulated cable is greater than a predetermined amount.

2. A method as recited in claim 1 wherein step (e) is practiced by generating an electrical signal.

3. A method as recited in claim 2 comprising the further step of terminating at least one of steps (b) and (c) in response to the generated electrical signal.

4. A method as recited in claim 2 or 3 comprising the further step of activating an alarm in response to the generated electrical signal.

5. A method as recited in claim 1 further utilizing a sensing member having a conically shaped aperture formed therein tapering in the direction of movement of the cable, and mounted for linear movement against a spring bias, and a signal generator; and wherein step (d) is practiced by feeding the cable through the conically shaped aperture in the sensing member so that if a cross-sectional dimension of the cable is greater than the smallest diameter portion of said conically shaped aperture in the sensing member, the sensing member will move linearly against the spring bias; and wherein step (e) is practiced by operatively mounting the signal generator in the path of movement of the sensing member so that the signal generator will be activated by movement of the sensing member.

6. Apparatus for forming insulated cable from uninsulated cable, comprising:
   a tubular cable guiding mandrel;
   a forming die;
   a guider tip for said mandrel;
   a molten insulation extruder for extruding molten cable insulation between the guider tip and forming die to coat the cable with insulation;
   means for feeding uninsulated cable from a source to the guiding mandrel, and for withdrawing the coated cable from the forming die;
   means for sensing the cross-sectional dimensions of the uninsulated cable during feeding thereof to the guiding mandrel; and
   means for generating a signal, in response to the cable sensing by said sensing means, if any cross-sectional dimension of the uninsulated cable is greater than a predetermined amount.

7. Apparatus as recited in claim 6 wherein said means for generating a signal generates an electrical signal; and further comprising means for terminating operation of at least one of said insulation extruder and said means for feeding and withdrawing cable, in response to the electrical signal generated by said signal generating means.

8. Apparatus as recited in claim 6 or 7 wherein said means for sensing the cross-sectional dimensions of the uninsulated cable comprises: a housing; a sensing member having a conically shaped aperture formed therein tapering in the direction of movement of the cable; said sensing member being mounted for slidable movement within said housing, with said conically shaped aperture disposed at one end of said housing and defining an entry into said housing at that end; spring biasing means for biasing said sensing member into a first position, the sensing member being slidable within said housing against the bias of said spring biasing means away from said first position toward a second position; and wherein said signal generating means is operatively mounted in the path of movement of said sensing means so that when said sensing means slides from the first position thereof to the second position thereof, said signal generating means is actuated.

9. Apparatus as recited in claim 8 wherein said signal generating means is mounted on said housing, and wherein said housing includes means defining a slit therein parallel to the direction of sliding of said sensing member; and wherein said sensing member includes an actuator extending outwardly therefrom perpendicular to the direction of sliding thereof, and extending through said housing slit.

10. Apparatus as recited in claim 8 wherein said housing further comprises means for mounting the end of said housing opposite said sensing member on said cable guiding mandrel so that said sensing member conically shaped aperture is in-line with the passageway extending through said tubular cable guiding mandrel.

11. Apparatus for sensing the cross-sectional dimensions of a cable and for generating a signal in response to sensing of any cable cross-sectional dimension greater than a predetermined amount, said apparatus comprising:
   a housing having first and second opposite open ends and defining an open volume between said first and second open ends;
   a sensing member having a conically shaped aperture formed therein;
   means for mounting said sensing member for guided slidable movement within said housing open volume in the dimension from the first end to the second end thereof, and so that said conically shaped aperture tapers from said first end of said housing to the second end thereof and is in-line with the openings in said first and second ends;
   a stop member associated with said housing first end for stopping movement of said sensing member;
   spring biasing means for biasing said sensing member into engagement with said stop member;
   a signal generating means; and
   means for mounting said signal generating means in the operative path of slidable movement of said sensing member.

12. Apparatus as recited in claim 11 wherein said housing further includes an annular shoulder member formed at an interior central portion thereof, and wherein said spring biasing means engages said shoulder member and said sensing member; and wherein said housing includes a slit formed in a wall thereof adjacent said first housing end, said slit extending in the dimension of slidable movement of said sensing member; and wherein said sensing member comprises an actuating member extending outwardly therefrom generally perpendicularly to the dimension of slidable movement thereof, and extending through said slit; and wherein said means for mounting said signal generating means mounts said signal generating means adjacent said slit so that said actuating member may move into operative engagement therewith.

* * * * *